Jan. 14, 1941.  M. WAGNER ET AL  2,228,740
MOTOR DRIVEN VEHICLE
Filed April 25, 1936  2 Sheets-Sheet 1

Inventors
Max Wagner
Josef Müller
O. A. Hücke Attorney

Jan. 14, 1941.   M. WAGNER ET AL   2,228,740
MOTOR DRIVEN VEHICLE
Filed April 25, 1936   2 Sheets-Sheet 2
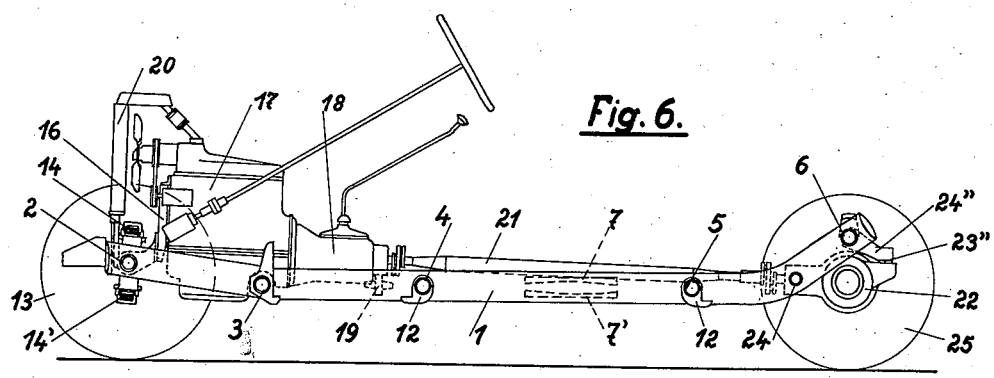
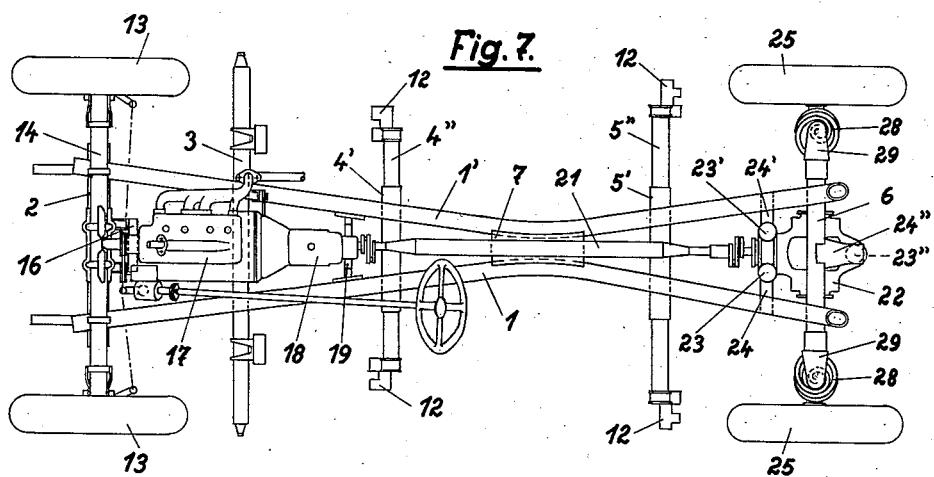
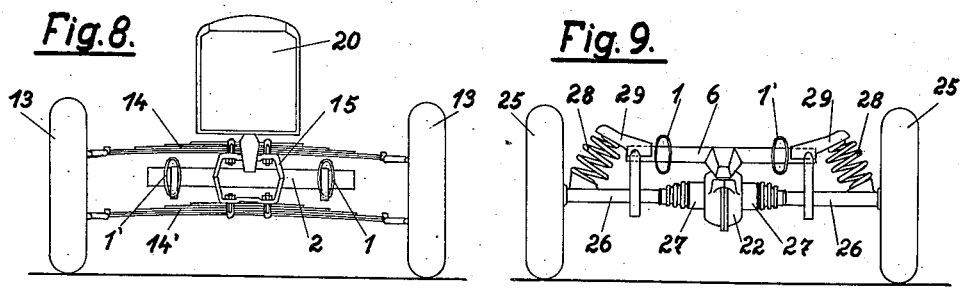
Inventors
Max Wagner
Josef Müller
A. A. Klicke, Attorney Patented Jan. 14, 1941

2,228,740

UNITED STATES PATENT OFFICE 2,228,740

MOTOR DRIVEN VEHICLE

Max Wagner and Josef Müller, Stuttgart, Germany, assignors to Daimler-Benz Aktiengesellschaft, Stuttgart-Unterturkheim, Germany, a Germany company Application April 25, 1936, Serial No. 76,321
In Germany May 4, 1935

22 Claims. (Cl. 280—106)

Our invention relates to a frame for the chassis of a motor-driven vehicle, and has for its object the provision of a frame of simplified structure, small weight and very high stiffness against twisting forces.

We have found that a very stiff frame structure will result from the provision of two longitudinal tubular beams so bent that they approach each other between their ends, and of a bridge member rigidly interconnecting the approaching portions of the longitudinal beams, whereby an X-shaped tube frame is formed.

Owing to the peculiar form of this frame and owing to the tubular form of the beams, the frame will be very stiff.

Preferably, the two longitudinal beams are interconnected by transverse tubular beams welded to the longitudinal beams. A frame of this type will prove lighter than a frame of the same stiffness against twisting which comprises parallel longitudinal beams. Preferably, the cross-section of the longitudinal beams is an oval one with the longer axis positioned vertically, as this will increase the bending strength of the longitudinal beams.

We prefer a frame structure in which the ends of the longitudinal beams diverging from the central connecting bridge substantially coincide with vertical planes, so that they may transmit vertical forces from their ends to the central bridge piece without being subjected to twisting torques.

Our invention has the further advantage of simplicity and reduced cost of manufacture, as the tubular longitudinal beams may be manufactured from stock material having the same cross-section over the entire length. The longitudinal beams and the transverse beams of the frame may be united by a simple welding operation. Similarly, the bridge member may be welded to the longitudinal beams in a simple manner.

The provision of two tubular longitudinal beams offers the possibility of a very simple attachment of the elements of the vehicle, such as motor, gear, axles and body. The high stiffness of the frame is particularly important when the wheels are independently suspended.

Viewed from another aspect, our invention resides in an improved structure of the transverse beams of the frame, these beams consisting of tubular members rigidly connected and preferably welded to the longitudinal beams and of bars or tubes which extend through the tubular members and project therefrom. Owing to this arrangement, the forces acting on the inner bar or tube will set up no or little bending stresses only in the point of connection of the longitudinal beams and the transverse beam. This is of particular importance when this connection is formed by a welding seam.

In a preferred embodiment of our invention, the frame comprises two longitudinal beams, preferably in form of tubes, and transverse tubular beams which extend beyond the transverse beams and are rigidly connected thereto, said transverse beams accommodating bars which extend out of the transverse beams.

Owing to this arrangement, the points of connection of the longitudinal beams and the transverse beams are relieved from bending stresses to a large extent, as these stresses are taken up by the inner bar and, therefore, do not act directly on the connection point. This improvement is of great importance for welded frames, as welded elements, particularly thin-walled elements, are liable to crack along the welding seam when subjected to higher bending stresses, especially so, if the welding seam is positioned close to the dangerous cross-section. As the inner bar passing through the tubular transverse beam is free from welding connections, it may take up the bending stresses without being liable to break.

Moreover, our invention provides for a more uniform stress set up in the transverse beams and, therefore, permits these beams to be made lighter.

Two preferred embodiments of our invention are shown in the accompanying drawings, in which;

Fig. 6 is an elevation of the chassis of a motor-driven vehicle equipped with our improved frame;

Fig. 7 is a plan view of the chassis;

Fig. 8 is the end-view from the left of Fig. 7 and

Fig. 9 is the end-view from the right of Fig. 7.

Figure 1:
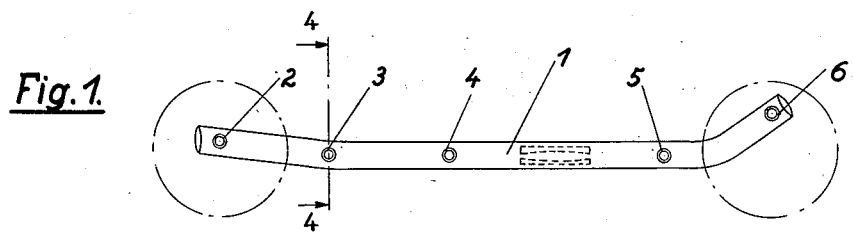
Fig. 1 is a side-view of the improved frame, the wheels of the chassis being diagrammatically indicated by dash-and-dot lines.
Figure 2:
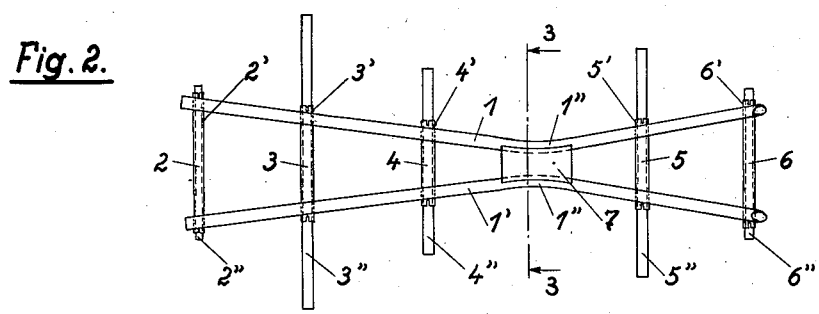
Fig. 2 is a plan view of Fig. 1.
Figure 3:
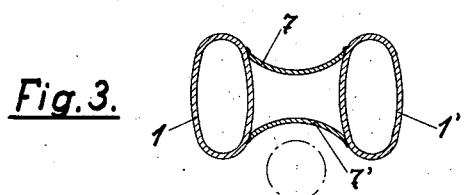
Fig. 3 is the section taken along line 3—3 of Fig. 2 on an enlarged scale.

Our improved frame consists of two tubular longitudinal beams 1, 1' and of five transverse beams 2, 3, 4, 5 and 6. The longitudinal beams have an oval cross-section as will appear from Fig. 3, and they are so shaped that they approach each other intermediate their ends. Their approaching portions are interconnected by a suitable bridge member, whereby an X-shaped frame is formed. The bridge member may consist of two curved sheet metal plates 7 and 7' which are so arranged that their convex faces are opposed to each other. The sheet metal plates are welded to the longitudinal beams. The ends of the beams 1, 1' diverging from the bridge member 7, 7' lie in substantially vertical planes. Therefore, each beam may transmit a vertical force from one of its ends to the bridge piece without being subject to a twisting couple. The front ends of the longitudinal beams are slightly upwardly inclined as shown in Fig. 1, whereas the rear ends are upwardly inclined at a larger angle in such a manner that the axis of the front wheels will substantially intersect the ends of the beams 1 and 1', while the axis of the rear wheels will pass below the rear ends of the beams.

In accordance with another feature of our invention, the transverse beams 2, 3, 4, 5 and 6 are each composed of a tubular member 2', 3', 4', 5' or 6', respectively, and of a bar or tube 2'', 3'', 4'', 5'' or 6'' respectively passing therethrough. The tubular members 2', 3' etc. are rigidly welded to the longitudinal beams 1 and 1' which are preferably provided with transverse holes through which the ends of the transverse tubular members project. The tubular transverse beams are preferably of circular cross-section and are welded to the walls of the longitudinal beams throughout their periphery, their ends projecting beyond the outer welding seams 9, as indicated at 8'. The inner elements of the transverse beams may be formed by tubes which are tightly fitted within the outer tubular members, for instance by shrinking, in such a manner, that the inner surface of the outer tubular members bears upon the outer surface of the inner bars or tubes with a uniform pressure. If it is desired to secure the inner transverse beam member, such as 4'', against rotary or longitudinal displacement within the outer transverse beam member, such as 4', a welding spot 11 may be provided within the longitudinal central plane of the frame, preferably at the lower side of the transverse beam member.

The projecting ends 8' of the outer beam members are suitably weakened so as to offer a reduced resistance to a bending strain of the inner bar or tube. In the embodiment illustrated slots 10 are provided for this purpose.

The torsional stresses set up in the welding seams by twisting forces acting on the frame will be uniformly distributed over the entire circumference of the welding seams and will thus be taken up by the outer tubular elements 2', 3' etc. Owing to the nested relationship of the two transverse frame members, the forces acting on the ends of the inner member, such as 4'' in Figs. 4 and 5, will set up no or but little bending stresses in the welding seams, and will produce a stress substantially only in the inner element which is free from welding seams and is reinforced by the surrounding outer element, such as 4'.

The nested elements of the transverse beams may be compared with superimposed leaf-springs as they are rigidly connected to each other near their center only at 11. Owing to this arrangement, the stresses are uniformly distributed over their length and a characteristic curve representing the transverse force effective between the two elements would gradually rise towards the ends of the outer tube member. This effect is enhanced by the weakened projecting ends 8' of the outer transverse member, which, owing to the slots 10 offer but a slight resistance to a bending strain on the inner member.

It will be appreciated that the composite transverse beam, such as 4', 4'', has similar qualities as a beam of uniform safety, as it has an increased resistance against bending in its middle portion, that is to say, near the longitudinal beams because of the combined cross-section of the two nested members, whereas the smaller bending stresses near the ends are sufficiently taken up by the cross-section of the inner tube only.

Such a structure of the transverse beam is of particular advantage when it projects far beyond the longitudinal beams or has to take up comparatively heavy loads at its ends producing considerable bending stresses within the transverse beam. Therefore, our improved transverse beams are particularly adapted to support the body, the wheel suspension or the like.

In Figs. 6 to 9 we have shown a chassis equipped with our improved frame. In this embodiment, the two intermediate transverse beams 4 and 5 only are composed of nested tubes 4', 4'' and 5', 5'' respectively, whereas the transverse beams 2, 3 and 6 are formed by simple tubes welded to the transverse beams 1 and 1'. The ends of the transverse beams 4 and 5 are provided with suitable fixtures 12 for the attachment of the body of the vehicle. These beams have to take up the largest bending stresses.

The front wheels 16 are guided parallel to themselves by two parallel transverse leaf-springs 14 and 14' which are mounted on spring-supports 15 rigidly connected with, for instance, welded to the transverse beam 2. Moreover, the transverse tubular beam 2 carries a bracket 16 attached thereto or to the supports 15. This bracket 16 supports the front end of the motor unit consisting of the motor 17 proper and of the change-gear box 18. The rear end of this unit is supported by a comparatively short transverse beam 19. Preferably, the point of support of the motor unit on the bracket 16 is positioned within a comparatively high level in such a manner, that the line of connection of this point with the point of support of the unit on the beam 19 intersects the center of gravity of the unit. Rubber elements may be interposed at the points of support.

The transverse beam 3 passes beneath the motor unit and supports the mud guards, spare wheels or other elements of the vehicle.

The radiator 20 may be mounted on the transverse beam 2 or on suitable supports attached thereto.

The drive shaft 21 passes above the upper plate of the bridge member 7 towards the differential gear 22. The differential gear case 22 is supported by the frame in three points designated by 23, 23', 23'', suitable rubber pads being interposed. These points are located on brackets 24 and 24' attached to the longitudinal beams 1 and 1' and on a bracket 24'' attached to the transverse beam 6.

The rear wheels 25 are mounted on independently swingable axles 26 pivoted to the differential gear casing 22 at 27. Helical springs 28 free from guiding means are interposed between the axles 26 and brackets 29 suitably attached, for instance, welded to the ends of the rear transverse beam 6.

Figure 4:
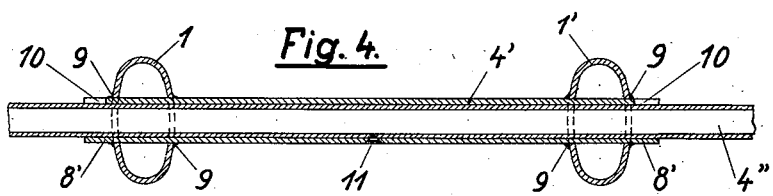
Fig. 4 is the section taken along line 4—4 of Fig. 1 on an enlarged scale.
Figure 5:
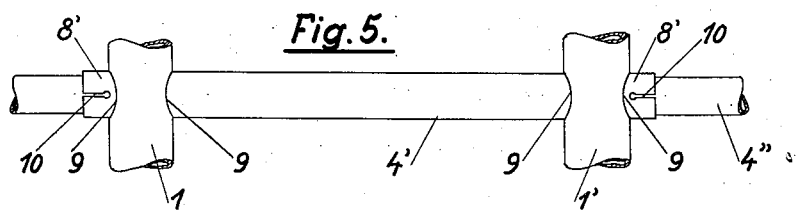
Fig. 5 is a portion of Fig. 2 shown on the same scale as Fig. 4.

The transverse beam 6 may be formed by a single tube or by two nested tubes as shown in Figs. 4 and 5. The same applies to the transverse beams 2 and 3.

From the foregoing description it will be apparent that the entire driving means are arranged intermediate the two longitudinal beams I and I', the motor unit being accommodated between the diverging front ends of the longitudinal beams, whereas the rear axle drive is arranged between the diverging rear ends thereof. Owing to this arrangement, these elements are very safely secured in position and relieved from undesirable stresses.

While we have illustrated two specific embodiments of our invention, we wish it to be understood that the same is not limited to the described details, but is capable of numerous modifications.

What we claim is:

1. A frame for the chassis of a vehicle, comprising two round tubular longitudinal beams approaching each other between their ends and two curved sheet metal plates positioned one above the other and having their convex sides arranged in opposed relationship, and welded to said beams to connect the approaching sections thereof.

2. A frame for the chassis of a vehicle, comprising two tubular longitudinal beams provided with transverse holes, transverse tubular beams extending through said holes and welded to said longitudinal beams, and bars extending through and projecting out of said tubular transverse beams and adapted to support the body or other elements of the vehicle.

3. A frame for the chassis of a vehicle, comprising two tubular longitudinal beams approaching each other between their ends and provided with transverse holes, transverse tubular beams extending through said holes and welded to said longitudinal beams, a bridge piece composed of two plates rigidly connecting the approaching sections of said longitudinal beams, the ends thereof diverging from said plates, and tubes extending through said transverse beams and projecting therefrom and being adapted to support the body or other elements of the vehicle.

4. A frame for the chassis of a vehicle, comprising longitudinal beams provided with transverse holes, tubular transverse beams extending through said holes and having weakened ends projecting therefrom a slight distance and welded to said longitudinal beams, and tubes extending through said transverse tubular beams and adapted to support the body or other elements of the vehicle, said weakened ends reducing the bending stress set up in said tubes by the elements supported thereby.

5. A frame for the chassis of a vehicle, comprising two tubular longitudinal beams with oval cross-sections, the longer axis of which is in a substantially vertical plane, the beams approaching each other near their middle parts, and a bridge member rigidly connecting the approaching sections of said beams, the end of the beams diverging from said bridge member, whereby a substantially X-shaped tube frame is formed, and transverse tubular beams rigidly interconnecting the diverging ends of said longitudinal beams.

6. A frame for the chassis of a vehicle, comprising two tubular longitudinal beams approaching each other near their middle parts, and a bridge member rigidly connecting the approaching sections of said beams, whereby a substantially X-shaped tube frame is formed, transverse tubular beams rigidly interconnecting the diverging ends of said longitudinal beams, and transverse beams passing through said transverse tubular beams, each of said second named transverse beams being secured to said transverse tubular beams at one point only.

7. A frame of the chassis of a vehicle, comprising two tubular beams approaching each other near their middle parts, two curved sheet metal plates having their convex sides arranged in opposed relationship and rigidly interconnecting said beams at the approaching sections thereof, whereby a substantially X-shaped tube frame is formed, the front and rear ends of said longitudinal beams being upwardly inclined, and transverse tubular beams rigidly interconnecting the diverging ends of said longitudinal beams, and further transverse tubular beams passing through the interconnecting beams, said further transverse beams being secured to said first transverse beams at one point only.

8. A vehicle frame comprising in combination, a plurality of longitudinal tubular members, a plurality of transverse tubular members interconnecting said longitudinal members, and further transverse members shrunk-fit within certain of said transverse members.

9. The combination according to claim 2 in which said transverse tubular beams project beyond said longitudinal beams, said projecting portions having cut-out sections.

10. A vehicle frame comprising in combination a plurality of oval tubular longitudinal members, the longer axis of said ovals being in substantially vertical planes, and a plurality of tubular transverse members projecting through and rigidly interconnecting said longitudinal members.

11. A frame for the chassis of a vehicle, comprising two tubular longitudinal beams, approaching each other near their middle parts, and a bridge member rigidly connecting the approaching sections of said beams, whereby a substantially X-shaped tube frame is formed, transverse tubular beams rigidly interconnecting the diverging ends of said longitudinal beams, and transverse beams passing through said transverse tubular beams, each of said second named transverse beams being secured to said transverse tubular beams only at a middle point between the longitudinal beams.

12. A vehicle frame comprising, in combination, two substantially longitudinal frame members, at least one transverse tubular member rigidly interconnecting said frame members, and at least one further transverse member shrunk fit within said transverse tubular member.

13. The combination according to claim 12, in which said further transverse member projects outwardly of said tubular transverse member, said projecting portion being adapted for use as a body or other element supporting means.

14. The combination according to claim 12, in which said frame members are of oval cross section, the transverse tubular member extending through said frame members and welded to each of said frame members on both sides thereof, said further transverse member projecting beyond said frame members and outwardly of said tubular transverse member.

15. In a vehicle, a single, continuous, longitudinal tubular frame member having throughout its entire length a continually outwardly curved cross-section, the side walls of which have a greater circumscribing radius than the upper and lower walls connecting the two side walls and closing the same, so that an oval cross section results whose vertical diameter is greater than its horizontal diameter.

16. A frame having a tubular frame member according to claim 15, in combination with a further tubular frame member whose cross-section has a substantially less vertical diameter than that of said first frame member and which extends through the same transversely and is stiffly welded to the two side walls of said first frame member.

17. A frame according to claim 1, wherein the two curved plates positioned one above the other are connected with the tubular longitudinal beams in such a manner that they lie substantially tangential to the cross-sectional curve of the longitudinal beam, whereby a substantially smooth connection from the longitudinal beam walls to the connecting plate is produced.

18. The combination according to claim 1, in which the longitudinal beams have a continually outwardly curved cross section, the side walls of which have a greater circumscribing radius than the upper and lower walls connecting the two side walls and closing the same, the curved connecting plates extending tangentially to the upper and lower walls of the longitudinal beams.

19. In a vehicle, a frame comprising a pair of longitudinally extending beams having a tubular oval cross-section, each beam having a single slight inward transverse curve intermediate its ends, from which curve each beam extends to its ends in a straight line, and means for rigidly interconnecting said beams at their curved portion, whereby an X-shaped frame is formed.

20. In a vehicle, a frame comprising a pair of longitudinally extending beams having an oval cross-section whose vertical diameter is the greater, each beam having a single slight inward transverse curve intermediate its ends, from which curve each beam extends to its ends in a straight line, means for rigidly interconnecting said beams at their curved portions, whereby an X-shaped frame is formed, and tubular transverse beams piercing said longitudinal beam and welded to the side walls thereof.

21. In a vehicle, a frame comprising a pair of longitudinally extending beams having an oval cross-section whose vertical diameter is the greater, each beam having a single slight inward transverse curve intermediate its ends, from which curve each beam extends to its ends in a straight line, means for rigidly interconnecting said beams at their curved portions, whereby an X-shaped frame is formed, and tubular transverse beams extending through said longitudinal beams and welded to the side walls thereof, further transverse members extending through and interconnected with said transverse beams, said transverse members projecting beyond the end of said transverse beams and adapted to serve as a support for the body or other parts of the vehicle.

22. In a vehicle, a frame comprising a pair of longitudinally extending beams having an oval cross-section whose vertical diameter is the greater, each beam having a single slight inward transverse curve intermediate its ends, from which curve each beam extends to its ends in a straight line, means for rigidly interconnecting said beams at their curved portions, whereby an X-shaped frame is formed, tubular transverse beams extending through said longitudinal beams and welded to the side walls thereof, and further transverse beams extending through and interconnected with said transverse beams at the center thereof, said further transverse beams projecting beyond the end of said tubular transverse beams and adapted to serve as a support for the body or other parts of the vehicle.

MAX WAGNER.
JOSEF MÜLLER.